Dec. 7, 1965   R. C. THOMPSON ETAL   3,221,743
SYSTEM AND APPARATUS FOR POSITIONING AND
SECURING SURGICAL IMPLEMENTS
Filed Aug. 13, 1962   5 Sheets-Sheet 2

INVENTORS
RICHARD C. THOMPSON
WALTER H. GOODWIN
BY
Christie, Parker & Hale
ATTORNEYS Dec. 7, 1965 R. C. THOMPSON ETAL 3,221,743
SYSTEM AND APPARATUS FOR POSITIONING AND
SECURING SURGICAL IMPLEMENTS
Filed Aug. 13, 1962 5 Sheets-Sheet 3

FIG.3

INVENTORS.
RICHARD C. THOMPSON
WALTER H. GOODWIN
BY
Christie, Parker & Hale
ATTORNEYS.

Dec. 7, 1965 R. C. THOMPSON ETAL 3,221,743
SYSTEM AND APPARATUS FOR POSITIONING AND
SECURING SURGICAL IMPLEMENTS
Filed Aug. 13, 1962 5 Sheets-Sheet 4

FIG_6_

FIG_7_

INVENTORS.
RICHARD C. THOMPSON
BY WALTER H. GOODWIN

Christie, Parker & Hale
ATTORNEYS.

Dec. 7, 1965    R. C. THOMPSON ETAL    3,221,743
SYSTEM AND APPARATUS FOR POSITIONING AND
SECURING SURGICAL IMPLEMENTS
Filed Aug. 13, 1962    5 Sheets-Sheet 5

INVENTORS.
RICHARD C. THOMPSON
BY WALTER H. GOODWIN
Christie, Parker & Hale
ATTORNEYS.

United States Patent Office 3,221,743
Patented Dec. 7, 1965

3,221,743
SYSTEM AND APPARATUS FOR POSITIONING
AND SECURING SURGICAL IMPLEMENTS
Richard C. Thompson, San Mateo, and Walter H. Goodwin, Sierra Madre, Calif., assignors to Du Pa Co., Inc., Arcadia, Calif., a corporation of California
Filed Aug. 13, 1962, Ser. No. 216,513
13 Claims. (Cl. 128—303)

This invention relates to systems and apparatus for holding surgical accessories in selected positions relative to an operating table. More particularly, this invention relates to supporting rods, clamps and adjustable joints for supporting surgical accessories in selected positions relative to the rail of an operating table, and relative to a patient supported on the operating table.

At the present time a need has developed for the provision of a trouble-free system for precise supporting, suspending and positioning of surgical accessories from the rail of an operating table. A number of factors have contributed to this need. The need has been made more acute by the great strides which have been made in surgical techniques involving utilization of longer, more complicated and heretofore unknown procedures. At the same time there has been an increasing scarcity of trained personnel capable of performing or assisting in such procedures. For example, in a gall bladder operation adequate exposure of the gall bladder frequently requires the presence of at least two surgical assistants. Retracting of the ribs and the liver to provide good exposure to the gall bladder can be a very difficult and tedious procedure. An operation involving resection of the abdominal aorta frequently requires the services of three surgical assistants. When resident physicians are not available to assist in such capacities, the cost to the patient of the second assistant can be a significant portion of the total expense. Furthermore, acting in such a capacity may prevent a highly trained physician from devoting time to duties more commensurate with his skill and ability. As a result, mechanical systems for positioning and holding the various retractors and the like required for such an operation have been developed.

Systems which have been known heretofore for supporting a mechanical retractor or similar surgical accessory, such as a laryngoscope, have not completely solved the problems presented. In many cases existing systems restrict access to the operating area. Installation of such systems frequently requires the use of special tools and the time required to set up such systems is frequently undesirably long. Additionally, many of the existing systems cannot be adjusted during an operation without disturbing the positioning of previously mounted or supported surgical accessories. An additional problem in existing systems is that the nature of the accessories to be used in the operation must be predetermined and the installation of the accessory supports must proceed according to a predetermined schedule. If an emergency develops during the operation, the existing systems often prevent the addition of supplemental accessories, particularly accessories which must be attached to the rail of the operating table. In other words, existing systems prevent the addition of supports for surgical accessories once the initial accessory support apparatus has been installed on an operating table.

The present invention provides a simple and flexible system which requires a minimum of effort and instruction in its utilization. Elements of the system may be attached to the rail of an operating table without requiring removal of supports previously mounted to the rail. Further, the mechanisms for connecting surgical accessories to the supporting rods of the system are quick-acting and do not require the use of special tools. Such fastening devices provide secure positioning and yet can be easily adjusted to permit universal alignment of the accessory relative to the support member. The invention may be utilized to permit Richardson retractors and/or Crile blades, as well as other surgical accessories, to be inserted into a wound at any position and to be secured at any desired angle relative to the wound. The use of the system of this invention therefore results in maximum access to the operating area not provided by systems heretofore known. With this invention only one surgical assistant is required to resection the abdominal aorta.

Generally speaking, this invention provides apparatus for positioning and supporting surgical accessories and implements in selected positions relative to an operating table and relative to the body of the patient supported upon the table. The apparatus includes a plurality of elongated accessory support rod elements and a rail clamp means engageable with the rail of the operating table. The rail clamp means includes means for securing at least one of the rod elements from axial and angular movement relative to the rail clamp, the rod element then being secured in a selected position relative to the patient. The invention further includes accessory and accessory support positioning and supporting clamp means connected to the said one rod element at a location spaced from the rail clamp means. The positioning and supporting means includes first and second clamping means engageable between the above said rod member and the accessory, and also a third means and a fourth means or actuator common to the pair of clamping means. The above said rod element and accessory are adjustable axially and angularly relative to the first and second means, and each of the first and second means is angularly adjustable relative to the other and to the third means when the actuator is in its unactuated condition. The above said rod member, the accessory and the first and second means are mutually secured from angular and axial movement when the actuator is in its actuated condition.

A particular feature of this invention is the accessory and accessory support positioning and supporting means. More particularly, the positioning and supporting means comprises a block having an aperture therethrough with a portion of the accessory being engaged in the aperture. The actuator is operable to constrict the aperture about the accessory to secure the accessory from axial and angular movement relative to the block, actuation of the actuator also serving to secure the block from angular and axial movement relative to the aforesaid rod element upon which the accessory support means is mounted.

The above-mentioned and other features and objects of this invention will be more clearly understood from the following detailed description and explanation of the invention taken in conjunction with the accompanying drawings, wherein.

Figure 3:
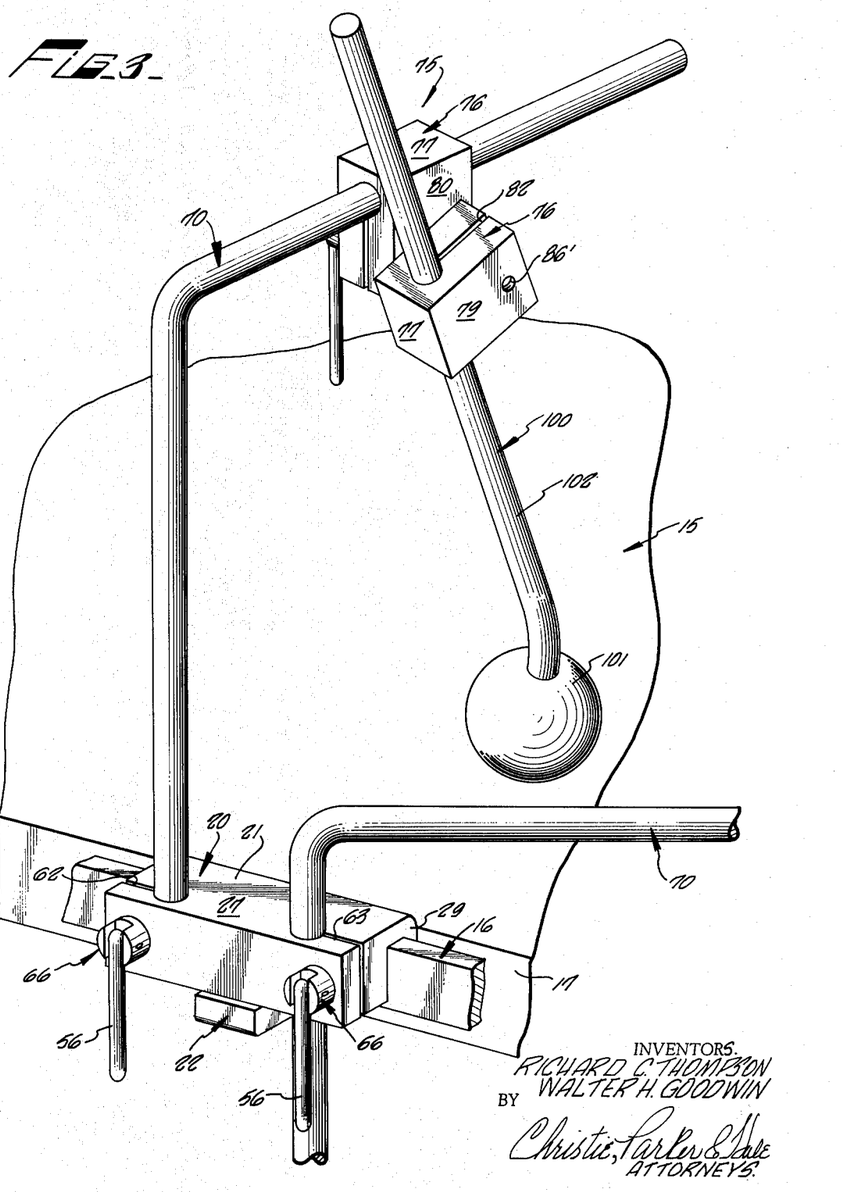
FIG. 3 is an enlarged perspective illustration of a rail clamp, a universal joint clamp and a chin support interconnected together and mounted upon the rail of an operating table.
Figure 6:
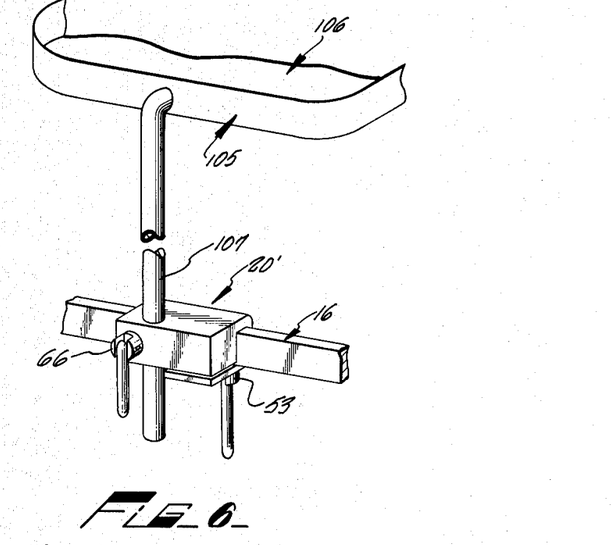
FIG. 6 is a perspective view of a Mayo stand supported in a rail clamp as provided by this invention.
Figure 7:
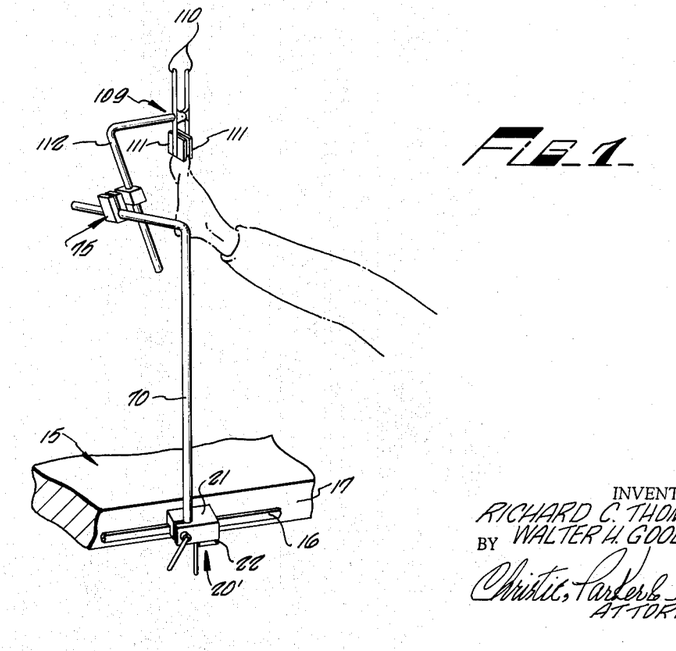
FIG. 7 is a perspective illustration of a method of supporting the limb of a patient by the apparatus of this invention.

Referring initially to FIGS. 3, 6 and 7, an operating table 15 having a rail 16 longitudinally thereof but spaced apart from the side edge 17 of the table 15 is illustrated. Substantially all modern operating tables provide a side rail of one of two standard rectangular types. One respect in which the two standard rails differ is in their cross-sectional geometry, one type being almost square. The rail 16 is mounted to the table 15 by a plurality of spacer blocks (not shown). Many tables are articulated and the side rails of such tables are discontinuous to provide for such articulation. Also, many tables provide a rail across the head and/or the foot of the table. In order to more fully understand the novel and inventive features of this invention, the system is described in detail subsequent to the following description of a rail clamp 20 (FIG. 3) and universal joints 75 (FIG. 3) of the system.

Figure 8:
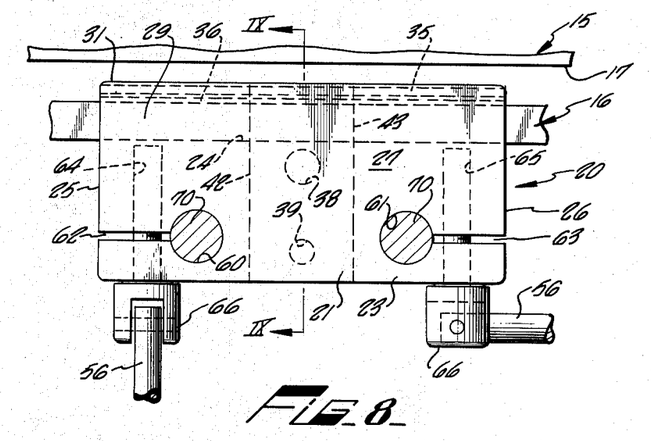
FIG. 8 is a top plan view of a rail clamp mounted to the rail of an operating table.
Figure 9:
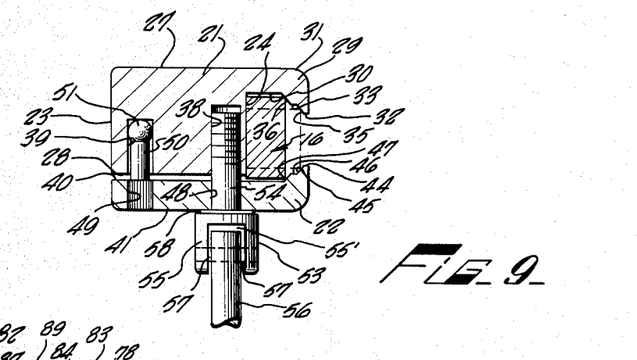
FIG. 9 is a cross-sectional elevation of the rail clamp as taken along line IX—IX of FIG. 8.

The rail clamp 20 provided as a constituent of this invention is more clearly shown in FIGS. 8 and 9 as including a base block or primary member 21 and a secondary block or jaw member 22. The rail clamp 20 is adapted for reception of two accessory support rods 70. An alternate embodiment of the structural principles involved in the clamp is illustrated by a clamp 20' adapted for the retention of only one accessory support member (see FIGS. 6 and 7). The base or main block 21 of the clamp 20 has a pair of longitudinal front and rear sides 23 and 24 and ends 25 and 26 disposed transversely in a generally rectangular configuration. The clamp 20 also has a substantially planar upper surface and a lower surface 28. A laterally extending flange or lip 29 extends outwardly along the length of the rear side 24 of block 21. The upper surface of the flange 29 preferably is coplanar with the upper surface 27 of block 21. The flange 29 has an underside 30 which is perpendicular to and intersects the side 24 of block 21 so as to be spaced from the lower surface 28 thereof. The flange 29 extends downwardly toward under surface 28 of block 21 to terminate in land or surface 32 preferably disposed substantially parallel to the flange underside 30. Intermediate of underside 30 and land 32 a secondary surface 33 is disposed parallel to the underside 30. Intermediate of the underside 30 and the secondary surface 33, and also intermediate of secondary surface 33 and the land or tip 32 of flange 29, the surface of the flange 29 is beveled or angled upwardly and inwardly toward the longitudinal edge 24 of the block to form inclined surfaces 35 and 36, respectively.

Illustrated in FIG. 9 in solid lines is the non-square type of operating table rail 16. The clamp 20 engages the rail 16 by means of the innermost inclined surface 36 of the flange 29 and by the longitudinal side 24 of the block. It should be noted that the rail 16 does not engage the flange underside 30.

A recess or hole 38 is drilled and tapped vertically into the block from lower surface 28 intermediate the ends 25 and 26 of block 21 and adjacent the side 24. A second hole or recess 39 is drilled into the block 21 from the lower surface 28 and lies between the first tapped recess 38 and the side 23 of the block. Recess 39 also lies in a plane which passes through the center of recess 38 and which lies perpendicular to the side 23 of the block 21.

The jaw member 22 of clamp 20 has an elongate extent preferably equal to the maximum width of the base or primary block 21. The jaw member 22 has planar, substantially parallel upper and lower surfaces 40 and 41 and longitudinal sides 42 and 43 lying perpendicular to the sides 23 and 24 of the base block 21. The upper inner end of the jaw member 22, lying beyond the side 24 of the upper block 21, is configured similar to the flange 29 of the upper block and has surfaces 44, 45, 46 and 47 corresponding, respectively, to surfaces 32, 35, 33, 36 of flange 29. A first passage or hole 48 is formed through the jaw member 22 between the upper and lower surfaces 40 and 41. The first passage 48 is aligned with the tapped recess 38 of the upper block when the surfaces of the upper inner end of the jaw member are aligned with the similarly configured surfaces of the upper block flange 29. A second passage or hole 49 is drilled through the block between the upper and lower surfaces 40 and 41 and is aligned with the second recess 39 of the upper block when the first passage 48 is aligned with recess 38 of block 21. A pivot pin 50, having a constricted diameter intermediate its ends, which diameter is less than the diameter of recess 39, has its lower end affixed into the jaw blocks 22 as by force-fitting, wedging, or the like. The upper end of the pivot pin 50 is formed into a spherical portion 51 and engages the closed end of the recess 39.

A clamp means closure element or bolt 53 is provided for connecting together the block 21 and jaw member 22. The bolt 53 has a shank portion 54, a portion of which is threaded. The shank portion 54 extends into the recess 38 through aperture 48 in the jaw element 22 and the threaded portion of the shank 54 engages the tapped portion of recess 38. The bolt 53 has an enlarged head which has a slot 55' diametrically thereof. A swivel handle 56 having a diameter less than the width of the head slot 55' is pivotally connected to the bolt head by a pin 57. A friction reducing washer 58, preferably fabricated from a low-friction synthetic material, is engaged between the bolt head 55 and the under surface 41 of the jaw element. The swivel handle 56 facilitates rotation of the bolt 53 in areas of limited access.

Engagement within recess 39 between the pivot pin 50 and the upper block 21 is slidable so that the jaw element 22 may be moved toward and away from the upper block 21 upon movement of the bolt 53 axially of recess 38. In this manner the clamp 20 may be engaged with the rail 16 of an operating table even though the ends of the rail are closed or blocked off by other rail clamps previously installed adjacent the ends of the rail. It is therefore seen that the rail clamp 20 provided by this invention is directly engageable with the rail of an operating table without regard to the condition or position of the other rail clamps previously connected to the table.

It was mentioned previously that the rail clamp of this invention is compatible with both of the two standard cross-sections of operating table rails. As illustrated in FIG. 9, the non-square type of operating table rail is illustrated in solid lines as engaged between surfaces 36, 47 and 24 of the rail clamp 20. The square-type of standard table rail is represented by dotted lines in FIG. 9 and is shown as engaging surfaces 33, 45 and 24 of the rail clamp 20. The clamping engagement is such that no wobble of the clamp relative to the rail is possible, thus the clamp 20 provides a stable connection of an accessory support member to the operating table.

Referring to FIG. 8, a pair of spaced apart passages or holes 60 and 61 are drilled through the upper block 21 perpendicular to the upper surface 27 of the block. Passages 60 and 61 lie adjacent the side 23 of the block and are disposed between the location of the jaw 22 and the ends 25 and 26 of block 21. In a preferred form of the invention, the passages 60 and 61 are one-half inch in diameter. A pair of slots 62 and 63, perpendicular to the upper surface 27 of block 21 and parallel to the side 23 of the block 21, are provided between passages 60 and 61, respectively, and the adjacent ends of block 21. The slots 62 and 63 preferably are coplanar and extend radially of the passages 60 and 61 to form a pair of bifurcations in the block 21. A recess or hole 64 is drilled into the block 21 and is perpendicular to the front surface 23. The hole 64 traverses the slot 62 between the passage 60 and the end 25 of the block. The termination of the recess 64 is tapped to accommodate the shank portion of a clamp actuator or bolt 66 similar to bolt 53 referred to with respect to FIG. 9. A recess 65 similar to the recess 64 is formed in the block 21 between passage 61 and the block end 26 and is provided with a similar bolt 66.

Figure 1:
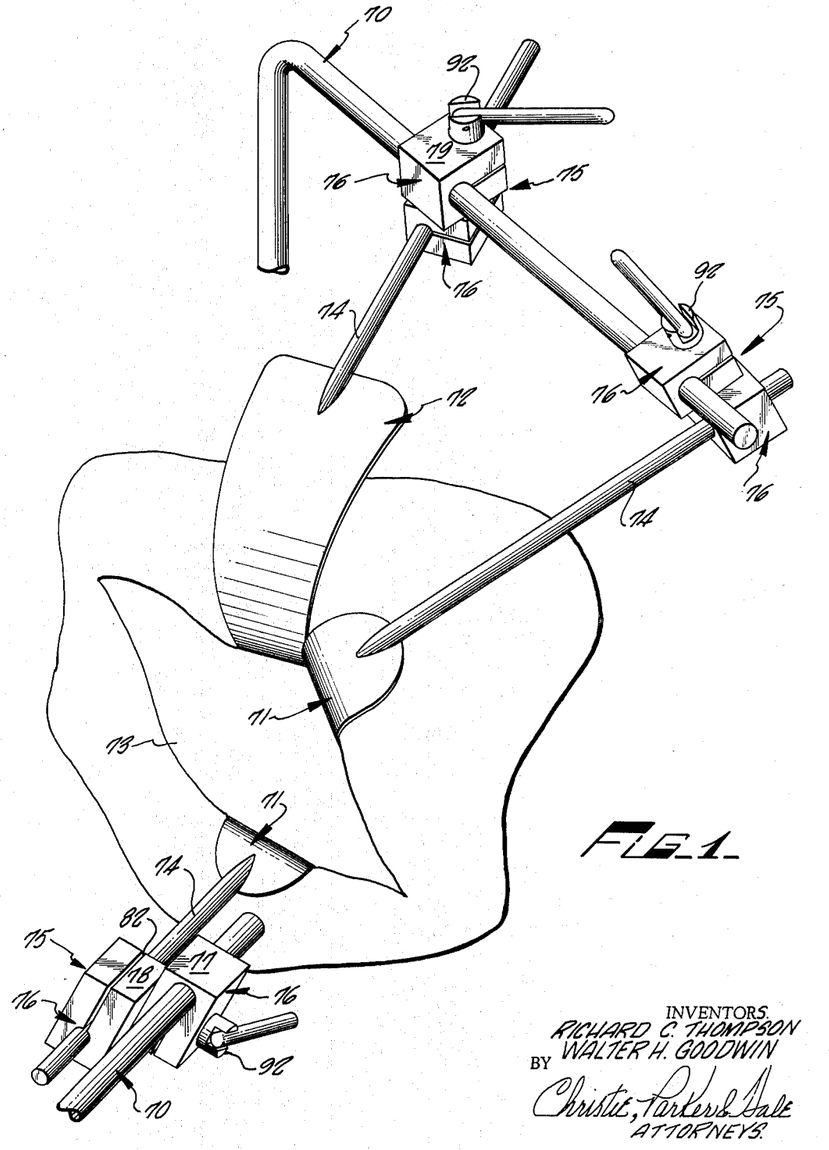
FIG. 1 is a perspective view of a plurality of surgical accessories engaged in a surgical wound and supported by the support apparatus of this invention.
Figure 2:
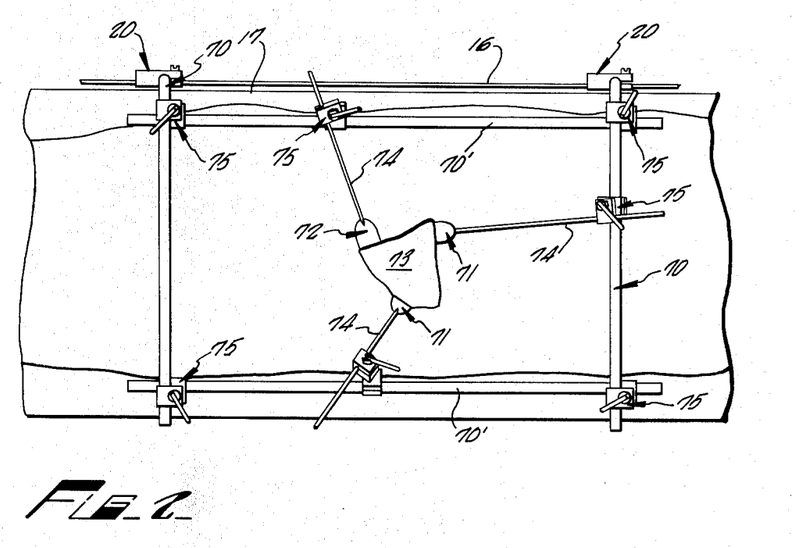
FIG. 2 is a plan view of an alternate type of installation of the support apparatus illustrating a plurality of surgical accessories secured to and positioned by the support apparatus.

As illustrated in FIGS. 1, 2, 3, 6, and 7, a plurality of substantially rigid primary accessory support rods or elements 70 are utilized in accordance with the invention. By way of example, in the embodiment illustrated in FIG. 3 the support rods 70 have a right angle bend intermediate of their ends, and preferably are of steel of nominal one-half inch diameter. In the embodiment of FIG. 2 straight primary support rods 70' are utilized with the invention. A pair of primary support rods 70 are shown in cross-section in FIG. 8 as engaged within the passages 60 and 61 of block 21. The rod 70 may normally be rotated within, and slid longitudinally through, the passages 60 and 61. However, when the bolts 66 and 66' are tightened against the side 23 of block 21 the bifurcations close about the rod 70 to clamp them to the body 21. Thus, by rotation of the bolts 66, 66' through engagement of the handles 56 the bolts may be firmly engaged with the forward surface 23 of the rail clamp 20. Such engagement causes the lateral clearance between the walls of slots 62 and 63 to be reduced whereby the peripheral clearance between the support rods 70 and the passages 60 and 61 is reduced so that the rods 70 are clamped by the block 21 to be secured from axial and angular movement relative to the rail clamp means 20.

Referring to FIG. 1, two Richardson retractors 71 and a Crile blade 72 are shown as engaged within the opening of a surgical wound 73. The retractors and the Crile blade are connected to primary support rods 70 by universal clamp means 75 of the present invention.

Figure 10:
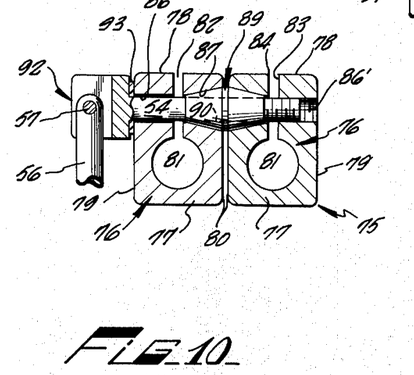
FIG. 10 is a cross-sectional elevation of a universal joint according to the invention.

As is most clearly indicated in FIG. 10, the universal joint clamp means 75 includes a pair of clamping devices or clamp blocks 76. Each block 76 is generally rectangular and has end surfaces 77 and 78, side surfaces 79 and 80 and front and back surfaces not shown. Each block has a bifurcation formed by an aperture or passage 81 and a slot 82. The passage 81 is formed parallel to the end and side surfaces 77–80 but lies closer to the end 77 than to the end 78 of the block 76. The slot 82, having spaced apart walls 83 and 84, opens into the end 78 and is perpendicular thereto and parallel to the sides 79 and 80 so as to be radial with respect to the passage 81. A second aperture or passage 86 extends through each block 76 from side 79 to side 78 so as to be perpendicular thereto. The passage 86 opens into the slot 82 and has a conical recess portion 87 between slot 82 and the side surface 80 opening outwardly onto the surface 80. The passage 86 of one of the blocks 76 has a threaded portion 86' between the side 79 and the slot 82.

Each universal joint clamp means 75 has a sleeve element 89 having a cylindrical bore 90 axially thereof. The sleeve element 89 is of a dual frusto-conical configuration; that is, the sleeve element 89 has an enlarged central portion tapering uniformly to either end about an axis formed by the bore 90. Each end of the sleeve element 89 has the reciprocal rate of taper with respect to that of the conical recess portion 87 of the passage 86 within which the sleeve 89 is associated. Preferably the taper angle, as referred to the axis of the bore 90, is in the range of from 10–25°. In a preferred form of the invention, however, the taper angle is 13°.

An actuator element 92, in the form of a bolt similar to bolt 53 described in conjunction with FIG. 9, is provided as a portion of each universal clamp means. Shank portion 54 of the bolt 92 extends through the passages 86 of the blocks 76 and engages the threaded portion 86'. The blocks 76 are positioned on the shank 64 such that the conical portion of each hole 86 opens onto one another. The tapered sleeve element 89 is loosely journaled on the bolt shank 54 and is disposed within the conical portions 87 of the apertures 86. A washer 93 of synthetic low-friction material is disposed between the head of the bolt 92 and the surface 79 of the left block 76. The angle of taper between the conical portion 87 of the hole 86 and the sleeve 89 is such that the sleeve element 89 binds in the conical recess portion 87 to secure the blocks from angular displacement relative to the sleeve and therefore relative to each other when the actuator 92 is in an actuated condition.

In a preferred form of the invention, the blocks 76 and the sleeve element 89 are fabricated from aluminum. Aluminum has a starting coefficient of friction with respect to itself of from 0.4 to 0.7. The exact nature of the coefficient of friction of the metals used in the clamp must be considered in conjunction with the angle of taper of the sleeve element 89 in order to provide a clamp 75 which will lock the blocks 76 relative to one another with the smallest amount of torque required to be applied to bolt 92. It is essential that a small amount of torque be applied to actuator 92 to provide complete operation of the clamp 75 since, in many cases, a nurse may have neither the time nor the physical strength to expend in operating a clamp which requires considerable force to operate. Low-friction washer 93 minimizes the force required for both tightening and loosening the clamping action.

The rods extending through the passages 81 are clamped by the bifurcations in a manner similar to that previously described with respect to FIG. 8. Thus, when a primary support rod 70 and a cylindrical portion of a surgical accessory or a secondary support rod 70' are engaged within the passages 81 of the clamping devices 76, actuation of the actuator or bolt 92 secures each clamping device or block 76 from angular and axial displacement relative to the element engaged within the passage 81. It is an element of this invention, however, that such axial and angular securing relation with respect to passages 81 is produced at substantially the same time that the binding relation between the sleeve 89 and each block 76 occurs. Accordingly, in order to accomplish such simultaneous locking relationship, it is essential that the thickness of any block between each passage 81 and the adjacent end surface 77 be the same as in any other block regardless of the diameter of the passage 81. In other words, in some of the clamping devices 75 provided by this invention, one block of a pair may have a one-quarter inch diameter passage 81 while the other block may have a one-half inch diameter passage 81. In both cases, however, the thickness of the block between the passage 81 and the adjacent end surface 77 of the block is the same, but the axes of the respective passages have different spacings with respect to the exterior surfaces 77.

The thickness of material between passage 81 and ends 77 is a primary factor in determining the spring rate of each block with respect to passage 81. The modulous of elasticity of the material from which the block 76 is fabricated is also to be considered in determining the proper spacing of passage 81 from the end surface 77 so that the simultaneous binding relationship between the passages 81 and the passage conical portion 87 exists.

The simultaneous locking feature of the universal joint of this invention may be more clearly understood by reference to FIG. 1. Each of the Richardson retractors 71 and the Crile blade 72 has an elongated circularly cylindrical shaft 74 connected to and extending away from the blade portion of the surgical accessory or implement. For example, the shaft 74 may be of steel of one-quarter inch diameter. Universal joint clamp means 75 has one clamping block 76 in engagement with a primary support rod 70 spaced from the rail clamp 20. The shaft portion 74 of the Crile blade 72 extends through the passage 81 of the second block 76. When the actuator bolt 92 of the universal joint clamp 75 is in an unactuated condition, that is when the bolt 92 is not tightened against the block 76, each of the blocks 76 is rotatable relative to the sleeve element 89. The block 76, through which the rod 70 extends, is then axially adjustable with respect to the rod 70 and the other block 76 of the pair is angularly adjustable with respect to the first block. Conversely, with respect to the block 76 through which the accessory shaft 74 passes, that block is axially and angularly adjustable along shaft 74. In such unactuated condition of the clamp means 75, the Crile blade 72 can be positioned in any desired position relative to the wound 73. Then, upon actuation by rotation of the actuator bolt 92, the blocks 76 are secured from axial and angular displacement relative to the primary support member 70 and to the accessory shaft 74 at the same time that the blocks 76 are secured from angular rotation relative to one another. If, at any time during an operation it is necessary to adjust a position of the accessory engaged in a universal joint clamp means 75, a comparatively small amount of rotation of the bolt 92 by the handle 56 immediately releases all of the elements of the clamp for relative movement.

Figures 4, 5:
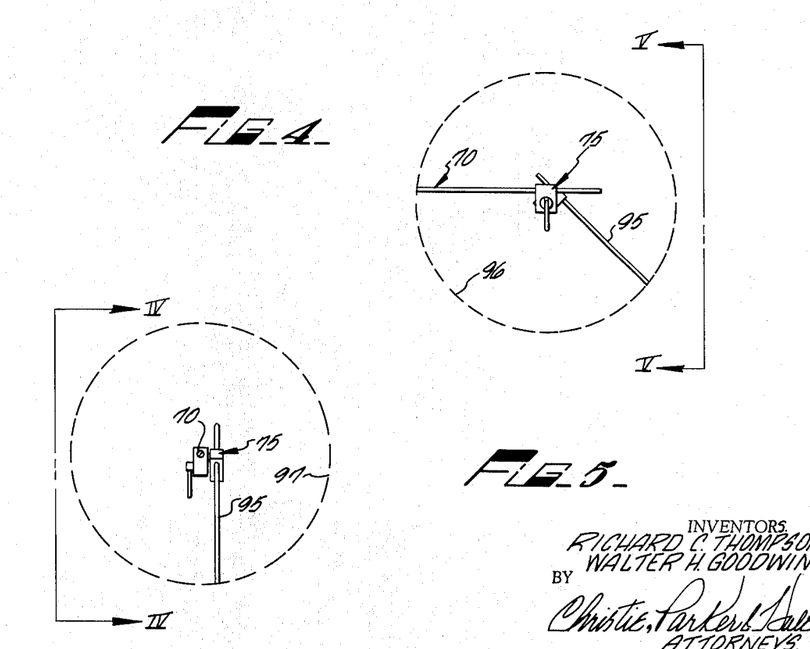
FIG. 4 is an elevation of an accessory engaged in a universal joint illustrating one aspect of the universal joint flexibility.
FIG. 5 is an illustration similar to FIG. 4 taken along lines V—V of FIG. 4.

The universal joint feature of the invention is most clearly illustrated with respect to FIGS. 4 and 5. A universal joint clamp means 75 is engaged between a primary accessory support rod 70 and a secondary support rod 95 with one block 76 of the clamp 75 maintained in a fixed position relative to the primary support element 70. The end of the secondary element 95 may be positioned at any location on the circle 96 since the blocks 76 of the clamp 75 are completely rotatable with respect to one another. In FIG. 5 the versatility of the clamp 75 is further illustrated wherein the angular relationship between the blocks 76 of the clamp is maintained constant, but the clamp 75 is rotated about the primary support element 70 such that the end of the secondary support 95 describes the circle 97.

In many instances, the operating table has a rail 16 along only one side thereof but it is necessary to position a retractor 71 from the side of the table opposite the rail 16. In such an instance, as is shown in FIG. 2, the primary support elements 70 are positioned in rail clamp means 20 along the rail 16 and then universal joint clamp means 75 are used to position a straight primary support element 70' between the spaced apart angled support element 70 adjacent the opposite side of the table. Such an installation permits more than one surgical implement to be supported from a single primary support element 70.

FIG. 3 illustrates a particular accessory provided in conjunction with this invention. A chin support 100, having a rubberoid sphere 101 mounted to the end of a shaft 102 is engageable with the underside of a patient's chin. The rod portion 102 of the chin support 100 preferably is ¼ inch in diameter and extends through the passage 81 of one block 76 of a universal joint 75. Preferably, the sphere 101 is a silicone rubber ball having a one inch diameter. The chin support 100, when used in conjunction with the primary accessory support 70, permits the application of pressure to the chin of the patient in any direction as gently or as firmly as may be necessary. During anesthesia of a patient an unobstructed breathing passage to the patient's lungs is essential. In prolonged operations the task of holding the patient's chin becomes fatiguing for the anesthetist. Previously, the simplest way to achieve a patent airway was to manually support the patient's chin. Thus continually occupied, the anesthetist could not attend to even the most simple additional tasks without the risk that a partially obstructed breathing passage would occur if he relaxed his support of the patient's chin. The chain support 100 renders unnecessary manual engagement of the chin of a patient during an operation. Furthermore, the operating area is no longer crowded by the anesthetist's hand. This is particularly important in tonsillectomies, thyroidectomies, dental extractions, and similar oral and throat operations. In the use of the chin support 100, however, it is recommended that occasional adjustments be made to change the pressure point where the silicone ball touches the skin. Such adjustability is inherent in the universal joint clamp means 75.

A Mayo stand 105 is illustrated in FIG. 6 as supported by a rail clamp 20' of the invention. The Mayo stand has a horizontal tray 106 and a downwardly depending circularly cylindrical extension rod 107 connected to one end of the tray. The extension rod 107 is engageable within the aperture 60 of the single support rail clamp 20'. During ophthalmological operations under general anesthesia, surgical drapes can be supported by the Mayo stand to provide easy access to the anesthesiologists endotracheal equipment and connections thereto can be maintained. After the patient is intubated, the Mayo stand is placed over the patient's chest and is secured by means of the rail clamp means 20'. Sterile drapes are then placed over the Mayo stand to leave the area below accessible to the anesthesiologist. One unique aspect of the Mayo stand used with this system, is that once in place, the operating table can be raised and lowered without necessitating additional adjustments of the Mayo stand for it follows the table. Previously, as the surgeon would raise or lower the table, the nurse would be required to make a simultaneous adjustment of the Mayo tray. The anesthetist would be required to make sure that his apparatus was not pushed out of shape or the Mayo tray was resting on the patient's chest.

FIG. 7 illustrates the convenience with which a limb of a patient may be positioned or supported through the use of the apparatus of this invention. A foot holder 109 is mounted to a primary support rod 70 by a universal joint clamp means 75 to support the leg of a patient in an elevated position. The foot holder 109 has a pair of hinged together, resiliently sprung arms 110. Each of the arms 110 has mounted thereto a sponge cushioned plate 111. The resilient bias between the arms 110 normally urges the plates 111 into contact. In use, however, the toes or fingers of a patient may be placed between the resiliently biased plates 111 to secure the foot or hand therebetween. The resiliently biased arms 110 are mounted to an extension portion 112 which is engaged in one of the blocks of the universal joint 75.

As used in describing this invention, the terms "surgical implements" and "surgical accessory" includes such implements as Davis and McIvor mouth props, a suspension laryngoscope, a hook for suspending bottles of saline solution, blood plasma or the like. These terms also include an arm board, such as Catalog No. 1699, Du Pa Co. Inc., Arcadia, California. In the case of the suspension laryngoscope, the laryngoscope has a cylindrical barrel of approximately 1 inch diameter in which the batteries for the light of the device are contained. In mounting a suspension laryngoscope to a support rod 70 of this invention, a special block, similar to block 76 of the universal joint clamp means 75, is provided. This special block has a one inch aperture, corresponding to passage 81 in which the barrel of the laryngoscope may be engaged. This special block comprises one of a pair of blocks 76 provided with the universal joint clamp means described in conjunction with FIG. 10. The apparatus may also be used to position and support X-ray cassettes.

This invention as described and illustrated above provides a system and apparatus which may be used by the average woman assistant present in an operating room. The quick-acting aspect of the universal joint clamp means 75 does not require great physical strength to obtain secure locking engagement between the respective parts of the clamp 75.

In special instances it may be desired that the locking functions of the universal joint clamp means 75 not be simultaneous. It may be desired that the elements engaged within the apertures 81 of blocks 76 be clamped prior to the time the blocks 76 are secured from displacement relative to one another. In such instances, the angle of taper of the conical portion 87 of hole 86 is made larger than the preferred 13° angle. Alternatively, the distance between the extremity of hole 81 and the adjacent exterior surface 77 of the block 76 may be reduced, or the lever arm between apertures 81 and 86 in each block 76 may be increased.

While the invention has been described above in conjunction with specific apparatus and configurations of apparatus, this has been by way of example only, particularly in respect to the surgical implements with which the supporting and clamping elements of the system are useful. The dimensional characteristics referred to above are not limiting to the scope of this invention except as specified in the following several claims.

What is claimed is:

1. In combination, a surgical accessory having a cylindrical portion and a patient supporting structure having a side rail, apparatus for positioning and supporting the accessory relative to the rail, the apparatus comprising:
   (a) an elongated accessory support bar having a cylindrical portion remote from the rail,
   (b) clamp means engaged with the rail and connected to the accessory support bar for positioning same relative to the rail,
   (c) releasable universal joint clamp means supporting and positioning the surgical accessory relative to the accessory support bar including
      (1) integral bifurcated first means engaged with the support bar substantially circumferentially of the cylindrical portion of the bar for axial and angular movement relative thereto,
      (2) integral bifurcated second means engaged with the accessory substantially circumferentially of the cylindrical portion thereof for axial and angular movement relative thereto,
      (3) third means engaged between the first and second means and providing continuous angular movement between the first and second means, and
      (4) selectively operable fourth means operatively connected to the first, second, and third means and operable
         (i) to bias together the bifurcations of the first means to secure the first means from angular and axial movement relative to the support bar,
         (ii) to bias together the bifurcations of the second means to secure the second means from angular and axial movement relative to the accessory, and
         (iii) to forcibly engage the first and second means with the third means to secure the first and second means from angular movement relative to the third means regardless of the positions of the first and second means relative to the third means substantially at the same time the bar and the accessory are secured from movement.

2. Apparatus according to claim 1 wherein each of the first and second means of the positioning and supporting means comprises a block having a first aperture therethrough and having a slot through the block extending from the aperture to an extremity of the block.

3. Apparatus according to claim 2 wherein each block has a second aperture through the block traversing the slot and in which the fourth means is engaged.

4. Apparatus according to claim 1 wherein the third means comprises a sleeve member having opposite conically tapered ends and wherein each of the first and second means has a recess therein configured to mate with an end of the sleeve member.

5. Apparatus according to claim 4 wherein the angle of taper of each end of the sleeve member is within the range of from 10° to 25° inclusive.

6. Apparatus according to claim 5 wherein the angle of taper of each end of the sleeve member is substantially 13°.

7. Apparatus according to claim 1 wherein the fourth means comprises a bolt extending through the first and third means and threaded into the fourth means.

8. A system for facilitating surgical operations by mechanically maintaining selected surgical implements in selected positions relative to the body of a patient, said implements and accessories each having a circularly cylindrical portion, the system comprising, in combination,
   (A) an operating table having a side rail,
   (B) at least one elongated circularly cylindrical rod element
   (C) rail clamp means engaged with the rail of the operating table upon which the patient is positioned, the rail clamp means including means for securing said rod element from axial and angular movement relative to the rail clamp in a selected position relative to the patient, and
   (D) implement holding means engaged with said one rod element at a location on said one rod element removed from the rail clamp means, the implement holding means being movable relative to the rod element when in unactuated condition and comprising
      (i) a block having a circular aperture therethrough in which the circularly cylindrical portion of one of an implement is engaged and in which the implement is axially and angularly movable when the holding means is in unactuated condition, and
      (ii) actuation means for constricting said aperture about the cylindrical portion of such implement to secure such one implement from axial and angular movement relative to the block, actuation of the actuation means also securing the implement holding means from angular and axial movement relative to said one rod element substantially simultaneously with securing the implement from movement relative to the block.

9. A universally jointed clamp for supporting a surgical accessory in a predetermined position relative to an accessory support rod mounted to an operating table, the clamp comprising
   (A) a pair of integral clamp blocks each having oppositely spaced apart first and second ends and spaced apart first and second sides, each block having
      (i) a first aperture formed therethrough parallel to the first end and nearer to the first end than to the second end,
      (ii) a slot formed therethrough parallel to the extent of the aperture and communicating between the aperture and the second end, and
      (iii) a second aperture formed therethrough between the first and second sides transversely intersecting the slot, the second aperture having conical walls diverging from the slot to the first side of the block,
   (B) an actuator shaft extending through the second apertures of the blocks,
      the blocks being disposed on the shaft with their first sides juxtaposed,
      the shaft being threadedly engaged with one of the blocks between the slot and second side of the one block and abutting the second side of the other block, and (C) a cylindrical barrel member loosely journaled axially on the shaft between the blocks, the barrel member having conically configured ends engaged in, and conforming to the configuration of, the second apertures of the blocks;

the first apertures and slots of the block being adapted to receive and allow an accessory support rod and an accessory to be adjusted axially and angularly therein and relative to the blocks when the shaft is unactuated, the blocks being angularly adjustable relative to each other when the shaft is unactuated, actuation of the shaft constricting the first apertures about such accessory support rod and such accessory to secure them from axial and angular movement relative to the blocks and securing the blocks from angular movement relative to each other by engagement of the conical surfaces of the blocks and barrel member.

10. In combination, a patient supporting structure having a side rail, apparatus for positioning and supporting surgical accessories and implements in selected positions relative to the structure comprising:

(a) a first elongated metal rod element, (b) jaw clamp means removably mounted to the rail of the patient supporting structure and engaged with the first rod element and including means lockably and releasably securing the first rod element thereto, said first rod element at the jaw clamp means being oriented substantially perpendicular to the rail, (c) a surgical instrument having a second rod element secured thereto, and (d) universal joint clamp means engaged with and connecting together the first rod element and the second rod element to a selected location along the first rod element from the jaw clamp means, the universal joint clamp means including a pair of integral bifurcated holding means engaged substantially circumferentially of the first and second rod elements respectively, and a rotatable shaft engaged with and connecting together the pair of holding means about which shaft the holding means are rotatable, the rod elements being movable axially and angularly of the holding means into selected positions relative to the rail, actuation of the shaft substantially simultaneously securing the holding means from rotation relative to the shaft regardless of the positions of the holding means relative to each other and securing the rod elements from axial and angular movement to the holding means.

11. In combination, a patient supporting structure having a side rail disposed along and in spaced apart relation to an edge thereof, apparatus for positioning and supporting a surgical accessory in a selected position relative to the rail, comprising:

(a) an elongated metal rod element, (b) a single jaw clamp means removably mounted on the rail and removably but releasably supporting the rod element securely in a selected position relative to the rail, (c) a surgical accessory having a cylindrical portion, and (d) universal joint clamp means engaged between the rod element at a location spaced from the jaw clamp means and the accessory cylindrical portion for releasably supporting the rod element and the accessory in a selected relation one to another, said universal joint clamp means having a single actuating means which is selectively operable to substantially simultaneously secure the rod element and the accessory from movement relative to the universal joint clamp means and relative to each other in said selected relation.

12. A clamp for supporting a surgical accessory support member with respect to a patient supporting structure having a rectangular side rail disposed along and spaced from an edge thereof, the apparatus comprising:

(a) a base member having (A) a longitudinal side defining a first planar surface for engagement with a surface of a rectangular side rail, (B) a flange integral with the base member extending laterally away from the base member and a portion thereof extending parallel with the first planar surface of said base member to define an extended end of the flange for positioning at an opposite side of such rectangular side rail from said first planar surface, the flange having (i) an undersurface intersecting the upper extent of the first planar surface, (ii) a land surface at said extended end and disposed intermediate the extent of the first planar surface of said base member, (iii) an intermediate surface on said extended end of the flange, and (iv) parallel first and second inclined surfaces extending from the land surface and the intermediate surface, respectively, toward the plane of the first planar surface, (C) an aperture extending through the base member for receiving an accessory support member, (D) a slot in the base member extending radially from the aperture from only one side of the aperture to an edge of the base member, (E) a hole in the base member traversing the slot, (b) a clamp member engaged with the rail and disposed adjacent the underside of the base member and having an extended end portion extending laterally beyond the plane of the first planar surface of the base member and defining a land surface, an intermediate surface and parallel first and second inclined surfaces aligned with the corresponding surfaces of the base member extended end and disposed in mirror image relation to said corresponding surfaces, (c) selectively operable actuator means engaged between the clamp member and the base member for moving the clamp member toward the base member for releasably clamping the clamp and the base members to such rail, (d) a pivot member extending from the clamp member and pivotally engaging the base member at a location of the base member opposite the actuator means from the first planar surface, and (e) means engaged in the base member hole and operable to constrict the aperture substantially circumferentially about the accessory support member to releasably secure the support member to the base member.

13. In combination, a patient supporting structure having a rail mounted along an edge thereof in spaced relation to the edge, a surgical accessory having a cylindrical portion, apparatus for positioning and securing the surgical accessory in a selected position relative to the body of a patient supported on the supporting structure, the apparatus comprising:

(a) an elongated cylindrical metal accessory support member, (b) rail clamp means engaged with the rail at a selected location along the rail, the rail clamp means being engageable with the rail independently of and intermediate similar rail clamp means engaged with the rail, the rail clamp means including (i) a clamp member having a laterally extending flange along one edge thereof toward the patient supporting structure, the flange remote from the rail clamp member depending to an end surface spaced from the clamp member, the flange having an undersurface and a substantially horizontal intermediate surface spaced between the end surface and the undersurface in directions both laterally and vertically of the clamp member at a location spaced apart from the clamp member on the flange, the flange further having first and second parallel surfaces inclined upwardly toward the rail clamp member from the flange end surface and intermediate surface, respectively, (ii) a jaw member similarly configured to the flange in mirror image correspondence thereto, (iii) means for pivotally mounting the jaw member to the clamp member, (iv) means defined by the clamp member releasably engaging the accessory support member and holding the accessory support member securely relative to the rail clamp means, and (c) accessory holding means connected to the accessory support member at a location spaced from the rail clamp means and including (i) a pair of clamping devices each comprising an integral block having a circular aperture therethrough, a slot through the block extending radially from only one side of the aperture to an external surface of the block to bifurcate the block, and a hole in the block arranged in the block so that it traverses the slot remote from the aperture, the cylindrical portion of the accessory and the accessory support member being engaged in the apertures of the respective blocks, one end of each hole defining a conical recess, (ii) a hollow barrel member having conically tapered ends engaged between the blocks with the opposite ends thereof disposed in and mated with respective ones of said recesses, and (iii) a rotatable actuator shaft passed through the holes and the barrel member and threaded into the hole in one block on the side of the slot therein opposite from the barrel member and abutted against the side of the other block opposite from the barrel member, (iv) the accessory support member and the accessory being adjustable axially and angularly relative to the clamping devices in said apertures and each clamping device being angularly adjustable relative to the other about the barrel member when the actuator is in an unactuated condition, operation of the actuator substantially simultaneously securing the accessory support member, the accessory and the clamping devices mutually from said relative movements so that the accessory is held in a selected position relative to the rail which it occupies when the actuator shaft is operated to place it in an actuated condition.

References Cited by the Examiner

UNITED STATES PATENTS

| | | | |
|---|---|---|---|
| 369,143 | 8/1887 | White | 287—54 |
| 1,059,545 | 4/1913 | Kunze | 269—267 |
| 1,516,795 | 11/1924 | Schwarting | 311—10 |
| 2,092,372 | 9/1937 | Goeller | 24—81 |
| 2,586,488 | 2/1952 | Smith | 128—20 |
| 2,614,558 | 8/1952 | Lovell | 128—87 |
| 2,670,732 | 3/1954 | Nelson | 128—20 |
| 2,733,035 | 1/1956 | Rocheleau | 24—81 |
| 2,932,867 | 4/1960 | Douglass | 311—10 |
| 2,938,414 | 5/1960 | Blomme | 269—268 |
| 3,025,089 | 3/1962 | Ramsden | 287—54 |
| 3,046,072 | 7/1962 | Douglass et al. | 311—10 |

FOREIGN PATENTS 464,787  4/1937  Great Britain.

RICHARD A. GAUDET, *Primary Examiner.*

JORDAN FRANKLIN, *Examiner.*